(12) United States Patent
Foster

(10) Patent No.: US 9,096,119 B2
(45) Date of Patent: Aug. 4, 2015

(54) VEHICLE DRIVE SYSTEM AND USE OF AN ELECTROMECHANICAL CONVERTER

(75) Inventor: Darren Leigh Foster, Eindhoven (NL)

(73) Assignee: NEDERLANDSE ORGANISATIE VOOR TOEGEPAST-NATUURWETENS CHAPPELIJK ONDERZOEK TNO, Delft (NL)

(*) Notice: Subject to any disclaimer, the term of this patent is extended or adjusted under 35 U.S.C. 154(b) by 182 days.

(21) Appl. No.: 12/808,751

(22) PCT Filed: Dec. 18, 2008

(86) PCT No.: PCT/NL2008/050813
§ 371 (c)(1),
(2), (4) Date: Sep. 15, 2010

(87) PCT Pub. No.: WO2009/078718
PCT Pub. Date: Jun. 25, 2009

(65) Prior Publication Data
US 2011/0272201 A1      Nov. 10, 2011

(30) Foreign Application Priority Data

Dec. 18, 2007   (EP) ..................................... 07076101

(51) Int. Cl.
*B60K 6/46*   (2007.10)
*B60K 6/448*  (2007.10)
(Continued)

(52) U.S. Cl.
CPC . *B60K 6/448* (2013.01); *B60K 6/26* (2013.01); *B60L 1/003* (2013.01); *B60L 7/14* (2013.01); *B60L 11/123* (2013.01); *B60L 11/14* (2013.01); *B60L 15/2009* (2013.01);
(Continued)

(58) Field of Classification Search
USPC ............................................ 180/65.21–65.29
See application file for complete search history.

(56) References Cited

U.S. PATENT DOCUMENTS 5,917,248 A    6/1999   Seguchi et al.
6,380,653 B1   4/2002   Seguchi
(Continued)

FOREIGN PATENT DOCUMENTS

CN    100999190 A    7/2007
EP    1 068 977 A2   1/2001
(Continued)

OTHER PUBLICATIONS

Endo et al., "Development of Toyota's transaxle for mini-van hybrid vehicles", New Technologies & New Cars, JSAE Review, vol. 24, pp. 109-116, published by Elsevier Science B.V., 2003.
(Continued)

*Primary Examiner* — Jeffrey J Restifo
*Assistant Examiner* — Erez Gurari
(74) *Attorney, Agent, or Firm* — Birch, Stewart, Kolasch & Birch, LLP

(57) ABSTRACT

The invention relates to a vehicle drive system, comprising an electromechanical converter, in particular an electric variable transmission. The converter is provided with a primary shaft having a rotor mounted thereon, a secondary shaft having an interrotor mounted thereon and a stator, fixedly mounted to a housing of the electromechanical converter. Viewed from the primary shaft in radial direction, the rotor, the interrotor and the stator are arranged concentrically relative to each other. Further, the primary shaft is arranged for being driven by an output shaft of an engine and the secondary shaft is arranged for driving an input shaft of a transmission unit.

14 Claims, 2 Drawing Sheets

(51) Int. Cl.
  *B60K 6/26* (2007.10)
  *H02K 16/02* (2006.01)
  *H02K 51/00* (2006.01)
  *B60L 1/00* (2006.01)
  *B60L 7/14* (2006.01)
  *B60L 11/12* (2006.01)
  *B60L 11/14* (2006.01)
  *B60L 15/20* (2006.01)

(52) U.S. Cl.
  CPC ............... *H02K 16/02* (2013.01); *H02K 51/00* (2013.01); *B60L 2210/40* (2013.01); *B60L 2240/12* (2013.01); *B60L 2240/421* (2013.01); *B60L 2240/423* (2013.01); *B60L 2240/44* (2013.01); *B60L 2240/441* (2013.01); *B60L 2240/443* (2013.01); *B60L 2270/145* (2013.01); *H02P 2207/03* (2013.01); *Y02T 10/6217* (2013.01); *Y02T 10/6243* (2013.01); *Y02T 10/641* (2013.01); *Y02T 10/642* (2013.01); *Y02T 10/7077* (2013.01); *Y02T 10/7241* (2013.01); *Y02T 10/7275* (2013.01)

(56) References Cited

U.S. PATENT DOCUMENTS

| 7,164,219 | B2* | 1/2007 | Hoeijmakers | 310/266 |
| 7,721,833 | B2* | 5/2010 | Kikuchi | 180/65.28 |

FOREIGN PATENT DOCUMENTS

| EP | 1 710 113 A1 | 10/2006 |
| JP | S49-43311 A | 4/1974 |
| JP | 2000/261906 A | 9/2000 |
| JP | 2005/519571 A | 6/2005 |
| WO | WO 00/34066 A1 | 6/2000 |
| WO | WO 03/075437 A1 | 9/2003 |
| WO | WO 2006/009049 A1 | 1/2006 |
| WO | WO 2006/048968 A1 | 5/2006 |

OTHER PUBLICATIONS

Evans et al., "Powertrain Architecture and Controls Integration for GM's Hybrid Full-Size Pickup Truck", SAE Technical Paper Series 2003-01-0085, Reprinted From: Advanced Hybrid Vehicle Powertrains 2003 (SP-1750), 14 pages, 2003 SAE World Congress, Detroit, MI, Mar. 3-6, 2003.

Hoeijmakers et al. "The Electrical Variable Transmission", Industry Applications Conference, 2004. 39th IAS Annual Meeting. Conference Record of the 2004 IEEE, vol. 4, Oct. 3, 2004, XP010735385, pp. 2770-2777.

* cited by examiner

VEHICLE DRIVE SYSTEM AND USE OF AN ELECTROMECHANICAL CONVERTER

The invention relates to a vehicle drive system.

A known vehicle drive system that is provided with automatic transmission comprises a torque converter connecting an output shaft of an engine with an input shaft of a transmission unit. The torque converter serves as a launch element having two main functions, viz. a decoupling function and a torque multiplying function. By decoupling the engine from the transmission unit, propagation of vibrations can be counteracted. Further, by multiplying the torque of the engine output shaft, a higher torque becomes available.

However, due to the nature of such a design, the decoupling and torque multiplication functions are associated with slip, which leads to high losses. Due to the slip effect, a lock-up clutch can be used, with the side effect of elimination of torque multiplication. Further, the torque converter is a dominant source of heat generation within the transmission and therefore requires to a large extent cooling facilities. Also, the torque converter requires high oil flow levels to prevent starvation and cavitation leading to a large oil pump and large parasitic losses, especially at high speed since the pump has to be driven by the engine. In a hybrid vehicle, an electric support pump is also needed to ensure the transmission clutches are filled to allow quick launch. Further, such a system is not able to recover braking energy for later reuse in a hybrid electric vehicle.

In high level vehicle drive systems an early lock-up of a downsized torque converter is applied in combination with a relatively large number of gear speeds and optimized shift and slip control so as to minimize torque converter losses.

Patent publication EP 1 068 977 discloses a vehicle drive system wherein the torque converter has been replaced by an electric machine. However, such a construction suffers from poor efficiency when supplying power to vehicle accessories, such as a pump of an air conditioning system, since the load is very low compared to the rating of the electric machine.

International patent publication WO 03/075437 discloses an electromechanical converter, in particular an electric variable transmission, provided with a primary shaft having a rotor mounted thereon, a secondary shaft having an interrotor mounted thereon and a stator, fixedly mounted to a housing of the electromechanical converter, wherein, viewed from the primary shaft in radial direction, the rotor, the interrotor and the stator are arranged concentrically relative to each other, and wherein the rotor and the stator are designed with one or more windings, the interrotor forming one whole both mechanically and electromagnetically, being arranged as a conductor for the magnetic flux in an at least tangential direction. The primary shaft of the electromechanical converter is driven by an output shaft of a vehicle engine. The secondary shaft of the electromechanical converter drives the driving wheels of the vehicle.

An electric variable transmission (EVT) is an electromechanical converter with two mechanical ports, viz. a primary (driving) shaft and a secondary (driven) shaft, and an electric gate via which energy can be exchanged. If the electric gate is not used, the EVT works as a common infinitely variable transmission, where the transfer ratio has a very wide range. The EVT fulfills a function that is comparable to that of a combination of a clutch and a gearbox of a vehicle. In combination with the EVT, an engine in fact works as a power source, whereby the speed can be set according to an optimum characteristic of the engine. The fuel consumption, the noise level and the emission of noxious gases from the vehicle can thus be reduced. Because the EVT is an infinitely variable transmission, there are no gearshifting shocks during acceleration. It also means that always acceleration with a constant (maximally permissible) power is possible, and not, as in a conventional gearbox, with a more or less sawtooth-shaped course of the power as a function of the time. With the same engine, the acceleration with an EVT therefore proceeds faster than with a conventional gearbox. However, the EVT is a relatively large, heavy and expensive unit.

It is an object of the present invention to provide a vehicle drive system wherein at least one of the above-mentioned disadvantages is counteracted. In particular, the present invention aims at providing a more efficient vehicle drive system. To that end, according to the invention, the vehicle drive system comprises an electromechanical converter as disclosed in WO '437, wherein the primary shaft is arranged for being driven by an output shaft of an engine and the secondary shaft is arranged for driving an input shaft of a transmission unit.

By arranging the primary shaft and the secondary shaft of the electromechanical converter for being driven by the output shaft of an engine and for driving an input shaft of a transmission unit, respectively, the ratio range of the primary shaft with respect to the secondary shaft is smaller during operation of the vehicle drive line than in a configuration wherein the secondary shaft of the electromechanical converter is directly coupled to the driving wheels of the vehicle. Therefore, electric components of the electromechanical converter can be implemented relatively small, thereby reducing the size, weight and cost price of the electromechanical converter.

By replacing the conventional torque converter by the electromechanical converter, said electromechanical converter functions as a launch element by decoupling the engine and the transmission, while providing a torque multiplication. The use of the electromechanical converter in combination with a transmission unit incurs significantly less losses as would be experienced when using the conventional torque converter. Since the electromechanical converter has a high efficiency performance, the transmission unit can be implemented with a relatively small number of gear steps allowing wider steps between gear ratios.

Since, the electromechanical converter transmits the applied engine torque, the load presented by any vehicle accessories is additional to load presented by the engine advantageously leading to a more efficient loading factor.

Due to the inherent character of the electromechanical converter, braking energy can be recovered and electric driving functions can be provided when the converter can be coupled to an electrical storage system.

Further, by arranging a further transmission unit in series with the transmission unit, the ratio range of the primary shaft with respect to the secondary shaft of the electromechanical converter can be chosen more easily close to unity, thus further improving the efficiency of the vehicle drive system. Alternatively, the vehicle drive system is provided with a single transmission system. Additionally, by providing the further transmission unit between the engine output shaft and the electromechanical converter primary shaft, the speed of the primary shaft can increase, thereby allowing even smaller electric components of the electromechanical converter, thus rendering the entire system more compact, lighter and of lower cost.

The invention also relates to a use of an electromechanical converter.

The invention will now be further elucidated on the basis of exemplary embodiments, as represented in the accompanying drawing, wherein FIG. 1 shows a schematic view of a vehicle drive system according to a first embodiment of the invention;

Corresponding parts in the figures are indicated with the same reference numerals where possible.

Figure 1:
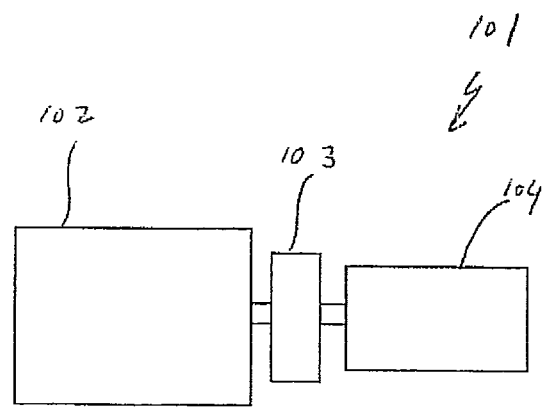

FIG. 1 schematically shows a vehicle drive system 101 according to a first embodiment of the invention. The vehicle drive system comprises an engine 102, an electromechanical converter 103 and a transmission unit 104 that is coupled to a driving shaft associated with driving wheels of the vehicle. The engine 102, the electromechanical converter 103 and the transmission unit 104 are mutually coupled so as to drive the driving wheels of the vehicle.

Figure 2:
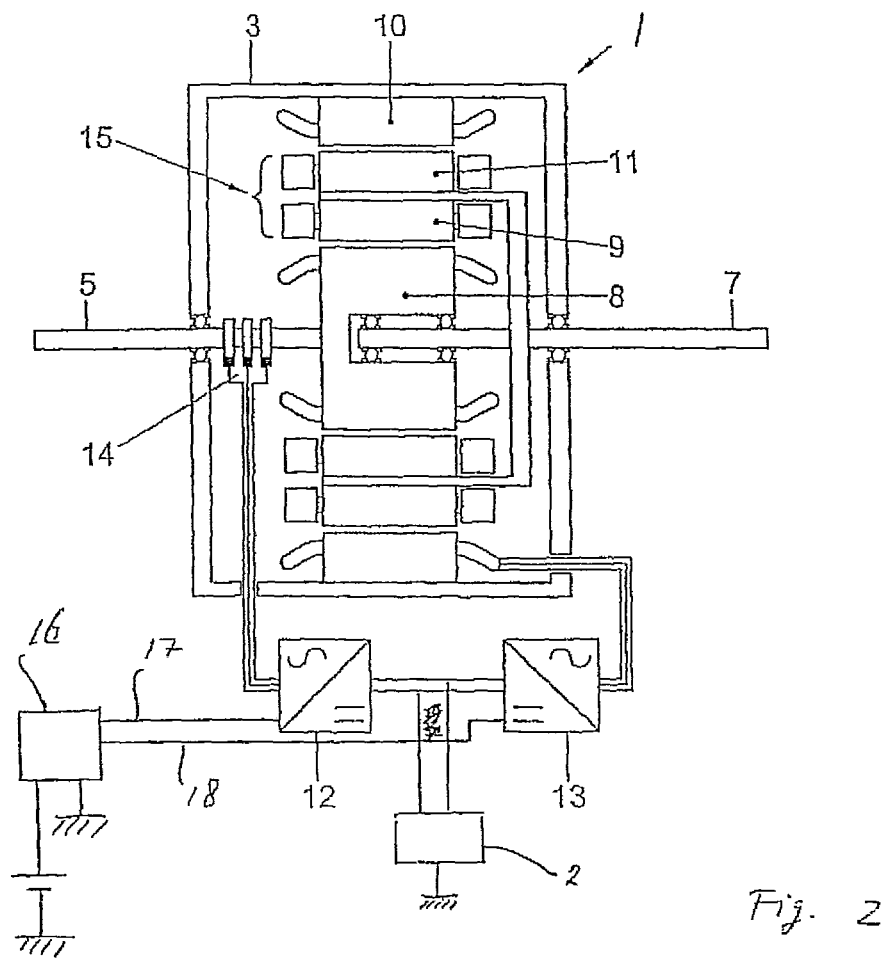
FIG. 2 shows a schematic view of an electromechanical converter.

The basic structure of the electromechanical converter, an electric variable transmission (EVT) 1, is schematically represented in FIG. 2. The EVT 1 comprises a housing 3 in which a primary induction machine with a primary shaft 5 and a secondary induction machine with a secondary shaft 7 are arranged. The two shafts 5, 7 are bearing-mounted in the housing 3. The primary induction machine comprises a rotor 8 formed by a slip ring armature with an electrically accessible polyphase winding, and a non-electrically accessible cage armature 9. The secondary induction machine comprises a stationary part, the stator 10, fixedly connected with the housing 3, and a cage armature 11 mounted on the secondary shaft 7. The secondary shaft 7 of the secondary induction machine is also bearing mounted in the rotor 8. The stator 10 has an electrically accessible polyphase winding. Between the rotor 8 and the stator 10, electric energy can be exchanged via a control unit, which here comprises a first power electronic AC/DC converter 12 connected to rotor windings via a combination 14 of slip rings and brushes, and a second power electronic AC/DC converter 13, which are both designed as an alternating voltage-direct voltage inverter. The DC terminals of the two inverters 12, 13 are interconnected and optionally connected to a DC storage energy system 2 comprised by the control unit, such as a battery or a supercap. The control unit further comprises a controlling element 16 for controlling electrical currents flowing in the windings. Therefore, the controlling element 16 controls the inverters 12, 13 via data lines 17, 18. The primary and secondary induction cage armature 9, 11 jointly form an interrotor 15. The basis of the EVT is the primary induction machine which works as a regenerating electromagnetic clutch, enabling low loss speed ratio control. The secondary machine, which is fed by the regenerated energy from the primary machine, works as an auxiliary motor enabling torque multiplication.

In an embodiment according to an aspect of the invention, the interrotor comprises a magnetic and an electric circuit, the magnetic circuit including a magnetic flux conducting cylinder and the electric circuit including a number of electric circuit-forming windings extending in the flux conducting cylinder, and wherein the interrotor is arranged as a conductor for the magnetic flux in a tangential and radial direction so that exertion of a direct torque between the rotor and the stator can occur upon magnetic saturation of the interrotor.

The primary shaft 5 of the electromechanical converter 1, 103 is coupled to an output shaft of the combustion engine 102, while the secondary shaft 7 is coupled to the input shaft of the transmission unit 104.

Preferably, a lock-up clutch is implemented between the rotor and the interrotor or between the engine output shaft and the transmission input shaft, so that the efficiency of the vehicle drive system is further improved. Obviously, the vehicle drive system can be arranged without any lock-up clutch, e.g. for cost price purposes.

The electromechanical converter 1, 103 has a high efficiency performance, thereby reducing the need of applying a lock-up. As a consequence, comfort levels in the vehicle can be improved. Further, the electromechanical converter 1, 103 does not require high oil flows. Use of the electromechanical converter 1, 103 further relaxes ratio step sizes between subsequent gear ratios, thereby enabling a simpler and cheaper transmission unit. On the other hand, by maintaining a relatively small step size between subsequent gear ratios, a required torque multiplication is reduced, thereby rendering the vehicle drive system even more efficient.

The transmission unit is arranged for providing a variable transmission, e.g. a stepped transmission such as a manually operable gearbox, an automatically operating gearbox, or a continuous transmission.

Figure 3:
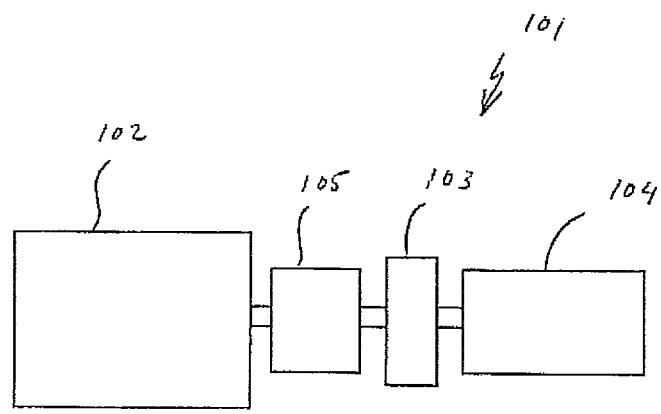
FIG. 3 shows a schematic view of a vehicle drive system according to a second embodiment of the invention.

FIG. 3 schematically shows a vehicle drive system 101 according to a second embodiment of the invention. Similar to the first embodiment of the invention, the vehicle drive system 101 comprises an engine 102, an electromechanical converter 103 and a transmission unit 104 that is coupled to a driving shaft associated with driving wheels of the vehicle. A further transmission unit 105 is arranged in series with the transmission unit 104. In particular, the input shaft of the further transmission unit 105 is coupled to the output shaft of the engine, and the output shaft of the further transmission unit 105 is coupled to the primary shaft of the electromechanical converter 103.

By applying an electromechanical converter 1, 103 the driving wheels of the vehicle can be driven mechanically, electrically or mechanically and electrically in a combined manner, simultaneously. As an example, the vehicle can be driven electrically when the engine 103 is switched off. The electrical DC storage system 2 then provides the power for driving the vehicle. By driving the vehicle both mechanically and electrically, an optimal driving state can be set from an energy point of view.

Further, the electrical buffer can store excess energy when the engine 102 produces more energy than is demanded by vehicle. Similarly, the electrical buffer 2 can provide additional energy to the electromechanical converter when the engine 102 produces less energy than is demanded by the vehicle, e.g. when the engine is idle. By providing an electrical source 2 and/or by selecting an appropriate transmission ratio, an optimal working range of the rotor/interrotor speed ratio can be defined for the electromechanical converter.

In a preferred embodiment according to the invention, the gear ratios of the one or more transmission units are designed such that the rotor/interrotor speed ratio is approximately unity. The electromechanical converter then operates in the most energetically efficient manner.

In a further embodiment according to the invention, an e-drive modus is implemented as a status wherein a vehicle is driven by an electrical motor drive system forming part of a hybrid drive system. During the e-drive modus, the combustion engine also forming part of the hybrid drive system, can be switched off. Further, said e-drive modus might also comprise a situation wherein the vehicle is at least partly driven by electrical power, e.g. when the output crank shaft of the combustion engine has a relatively low speed, e.g. during a stop of the vehicle, or when the combustion engine is running shorter than a predetermined time period.

When driving the vehicle, it is possible to generate more electrical power than is required for driving the vehicle. As indicated above, the excess electrical power can e.g. be stored in the electrical buffer 2 or supplied to other electrical vehicle systems.

The system is controlled to provide a given output torque and a given input speed thus simulating a torque converter. When combined with energy storage, this can be done using a power balance controller. Otherwise, a voltage control can be used.

With the engine running at idle, the EVT input torque is set to 0 Nm, decoupling the engine from the rest of the drive line, thereby counteracting a conflict with the engine speed controller.

Coordinated control of a stepped or continuous transmission and the EVT is possible to optimize the electrical efficiency of the chive, electric drive and regeneration functions. To ensure high efficiency, the control and layout is such to minimize size of the inverters and to maximize EVT efficiency, i.e. by operating the EVT primary and secondary shafts close to a ratio 1:1.

The invention is not limited to the exemplary embodiments described herein. It will be clear to the person skilled in the art that many variants are possible.

It is noted, that instead of applying polyphase windings in the rotor and the stator, monophase windings can be applied in the rotor and/or the stator.

Similarly, instead of using a combustion engine for driving the electromechanical converter, also another engine type can be used, e.g. a gas turbine.

It is further noted that the electromechanical converter can physically be integrated with the transmission unit, e.g. by using a planet wheel transmission.

It is also possible to design the interrotor otherwise, e.g. such that the interrotor does not comprise a pair of electrically inaccessible windings in a cage armature, but comprises a magnetic flux conducting cylinder, where on opposite sides thereof permanently magnetic material, for instance in the form of blocks, is arranged. Optionally, the permanently magnetic material is embedded. In another possible embodiment, the interrotor comprises a magnetic flux conducting cylinder, where on one side permanently magnetic material is applied and on the other side longitudinally extending grooves have been provided in which an electrically accessible winding has been arranged. In the latter case, however, it is to be ensured that a current supply point be present on the interrotor or on the secondary shaft; on the secondary shaft, slip rings can be easily mounted, via which current can be supplied or removed.

Other such variants will be obvious for the person skilled in the art and are considered to lie within the scope of the invention as formulated in the following claims.

The invention claimed is:

1. A vehicle drive system, comprising:
an electromechanical converter, in particular an electric variable transmission, provided with a primary shaft having a rotor mounted thereon, a secondary shaft having an interrotor mounted thereon and a stator, fixedly mounted to a housing of the electromechanical converter, wherein, viewed from the primary shaft in radial direction, the rotor, the interrotor and the stator are arranged concentrically relative to each other, and wherein the rotor and the stator are designed with one or more windings, the interrotor interacting with the rotor and the stator both mechanically and electromagnetically, and being arranged as a conductor for the magnetic flux in an at least tangential direction;
a transmission unit; and
a further transmission unit arranged in series with the transmission unit,
wherein the primary shaft is arranged for being driven by an output shaft of an engine and the secondary shaft is arranged for driving an input shaft of the transmission unit,
wherein the transmission unit is arranged for providing a variable transmission that is a stepped transmission or a continuous transmission, and
wherein an input shaft of the further transmission unit is directly coupled to the output shaft of the engine, and an output shaft of the further transmission unit is directly coupled to the primary shaft of the electromechanical converter, wherein the further transmission unit provides a variable speed ratio transmission.

2. The vehicle drive system according to claim 1, wherein the primary shaft is arranged for being coupled to the output shaft of the engine.

3. The vehicle drive system according to claim 2, wherein the secondary shaft is arranged for being coupled to the input shaft of the transmission unit.

4. The vehicle drive system according to claim 2, wherein the one or more windings of the rotor and/or the stator are of a mono- or polyphase type, and are electrically accessible.

5. The vehicle drive system according to claim 2, wherein the interrotor further comprises a magnetic and an electric circuit, the magnetic circuit including a magnetic flux conducting cylinder and the electric circuit including a number of electric circuit-forming windings extending in the flux conducting cylinder, and wherein the interrotor is arranged as the conductor for the magnetic flux in a tangential and radial direction so that exertion of a direct torque between the rotor and the stator can occur upon magnetic saturation of the interrotor.

6. The vehicle drive system according to claim 2, wherein electrically accessible windings of the rotor and/or the stator are connected to a control unit for controlling electrical currents flowing in the windings.

7. The vehicle drive system according to claim 1, wherein the secondary shaft is arranged for being coupled to the input shaft of the transmission unit.

8. The vehicle drive system according to claim 7, wherein the one or more windings of the rotor and/or the stator are of a mono- or polyphase type, and are electrically accessible.

9. The vehicle drive system according to claim 7, wherein the interrotor further comprises a magnetic and an electric circuit, the magnetic circuit including a magnetic flux conducting cylinder and the electric circuit including a number of electric circuit-forming windings extending in the flux conducting cylinder, and wherein the interrotor is arranged as the conductor for the magnetic flux in a tangential and radial direction so that exertion of a direct torque between the rotor and the stator can occur upon magnetic saturation of the interrotor.

10. The vehicle drive system according to claim 7, wherein electrically accessible windings of the rotor and/or the stator are connected to a control unit for controlling electrical currents flowing in the windings.

11. The vehicle drive system according to claim 1, wherein the one or more windings of the rotor and/or the stator are of a mono- or polyphase type, and are electrically accessible.

12. The vehicle drive system according to claim 11, wherein the interrotor further comprises a magnetic and an electric circuit, the magnetic circuit including a magnetic flux conducting cylinder and the electric circuit including a number of electric circuit-forming windings extending in the flux conducting cylinder, and wherein the interrotor is arranged as the conductor for the magnetic flux in a tangential and radial direction so that exertion of a direct torque between the rotor and the stator can occur upon magnetic saturation of the interrotor.

13. The vehicle drive system according to claim 1, wherein the interrotor further comprises a magnetic and an electric circuit, the magnetic circuit including a magnetic flux conducting cylinder and the electric circuit including a number of electric circuit-forming windings extending in the flux conducting cylinder, and wherein the interrotor is arranged as the conductor for the magnetic flux in a tangential and radial direction so that exertion of a direct torque between the rotor and the stator can occur upon magnetic saturation of the interrotor.

14. The vehicle drive system according to claim 1, wherein electrically accessible windings of the rotor and/or the stator are connected to a control unit for controlling electrical currents flowing in the windings.

\* \* \* \* \*